US011320881B2

United States Patent
Nigam et al.

(10) Patent No.: US 11,320,881 B2
(45) Date of Patent: May 3, 2022

(54) INTELLIGENT CURRENT LIMITER FOR A COMPUTING DEVICE

(71) Applicant: Maxim Integrated Products, Inc., San Jose, CA (US)

(72) Inventors: Vivek P. Nigam, Dublin, CA (US); Sangwon Lee, Pleasanton, CA (US); Robert Polleros, Sunnyvale, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 274 days.

(21) Appl. No.: 16/781,617

(22) Filed: Feb. 4, 2020

(65) Prior Publication Data

US 2020/0249737 A1    Aug. 6, 2020

Related U.S. Application Data

(60) Provisional application No. 62/800,843, filed on Feb. 4, 2019.

(51) Int. Cl.
*G06F 1/28* (2006.01)
*G08B 7/06* (2006.01)

(52) U.S. Cl.
CPC ...... *G06F 1/28* (2013.01); *G08B 7/06* (2013.01)

(58) Field of Classification Search
CPC ........................................................ G06F 1/28
See application file for complete search history.

(56) References Cited

U.S. PATENT DOCUMENTS

| 8,229,137 B2 | 7/2012 | Romesburg |
| 9,419,572 B2 | 8/2016 | Chiu et al. |

(Continued)

FOREIGN PATENT DOCUMENTS

| KR | 20110127865 A | 11/2011 |
| KR | 20180081269 A | 7/2018 |

OTHER PUBLICATIONS

PCT International Search Report and Written Opinion for PCT/US2020/016614, dated Jun. 5, 2020.

*Primary Examiner* — Mark A Connolly
(74) *Attorney, Agent, or Firm* — Kevin E. West; Advent, LLP (57) ABSTRACT

A mobile computing device includes one or more digital signal processors, each configured to receive a respective digital signal, one or more amplifiers, each configured to receive a respective digital signal, and one or more output generators configured to receive an output of a respective amplifier, and a battery configured to supply power to at least the amplifier(s). The digital signal processors include an intelligent current limiter. The intelligent current limiter is configured to determine a power consumption limit based on a battery voltage of the battery, a battery current limit defined by a battery current budget for operation of at least the amplifiers, and an efficiency of the amplifiers. The intelligent current limiter is configured to determine a predicted power consumption by the amplifiers based on voltages of the digital signals, a gain of each of the respective amplifiers, and an admittance of each of the respective output generators. The intelligent current limiter compares the predicted power consumption with the power consumption limit and adjusts the gain setting(s) of one or more of the digital signal processors based on the comparison prior to supplying the respective digital signals to the amplifiers.

20 Claims, 8 Drawing Sheets

(56) References Cited

U.S. PATENT DOCUMENTS

| | | |
|---|---|---|
| 9,930,450 B2 | 3/2018 | Matsuyama |
| 2004/0075459 A1 | 4/2004 | Eldridge et al. |
| 2005/0123970 A1 | 6/2005 | Ozbal et al. |
| 2010/0190459 A1 | 7/2010 | Li et al. |
| 2014/0067293 A1* | 3/2014 | Parivar ................ G06F 1/3206 702/60 |
| 2016/0062441 A1* | 3/2016 | Chou ................... G06F 1/3287 713/320 |
| 2018/0284859 A1 | 10/2018 | Pant et al. |
| 2021/0120351 A1* | 4/2021 | Zhao ........................ G06F 1/30 |

\* cited by examiner

INTELLIGENT CURRENT LIMITER FOR A COMPUTING DEVICE

BACKGROUND

Mobile computing devices are often powered by batteries. A hardware battery protection circuit typically protects the battery from overload conditions. The battery has a shutdown threshold current. In the event the amount of battery current drawn from the battery exceeds the shutdown threshold current, the battery protection circuit is triggered to shut down the battery.

Mobile computing systems typically include an audio system and a haptic system. The battery supplies battery current to the audio amplifier of the audio system and the haptic amplifier of the haptic system. Mobile computing devices often have a battery current budget allocated for the operation of the audio amplifier and the haptic amplifier. If the combined operation of the audio amplifier and the haptic amplifier draws battery current from the battery during the amplification/attenuation of digital audio signals and the digital haptic signals that exceeds the allocated battery current budget, the total amount of current drawn from the battery may exceed the shutdown threshold current and trigger the hardware battery protection circuit to shut down the battery.

In instances when the battery is shut down by the hardware battery protection circuit, resetting the battery and/or the hardware battery protection circuit of the mobile computing device may involve restarting the mobile computing device.

DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Overview

Mobile computing devices often include one or more digital output systems such as an audio system and/or a haptic system. A battery current budget is typically allocated for the combined operation of the digital output systems, e.g., of the audio system and the haptic system. The audio system includes an audio amplifier and the haptic system includes a haptic amplifier. An intelligent current limiter is used to manage the gain applied to a received digital audio signal at an audio digital signal processor and the gain applied to a received digital haptic signal at a haptic digital signal processor prior to the transmission of digital audio signals to the audio amplifier for amplification/attenuation and the transmission of the digital haptic signals to the haptic amplifier for amplification/attenuation to ensure that the combined operation of the audio amplifier and the haptic amplifier does not draw battery current from the battery that exceeds the battery current budget and trigger a battery shutdown.

In an embodiment, a mobile computing device includes a digital signal processor configured to receive a digital signal, an amplifier configured to process the received digital signal, an output generator communicatively coupled to the amplifier, and a battery configured to supply power to at least the amplifier. An intelligent current limiter is a component of the digital signal processor. The intelligent current limiter is configured to determine a power consumption limit associated with the amplifier based on a battery voltage of the battery, a battery current limit defined by a battery current budget for the amplifier, and an efficiency of the amplifier. The intelligent current limiter is configured to determine a predicted power consumption associated with the amplifier processing the digital signal based on a voltage of the digital signal, a gain of the amplifier, and an admittance of the output generator. The intelligent current limiter compares the predicted power consumption with the power consumption limit and adjusts the gain setting at the digital signal processor based on the comparison prior to supplying the digital signal to the amplifier for processing.

In embodiments, a mobile computing device can include one or more digital output systems such as audio systems, haptic systems, and the like. In such embodiments, the mobile computing device may include two or more digital signal processors configured to receive respective digital signals, two or more amplifiers (e.g., audio amplifiers, haptic amplifiers, and so forth), and two or more output generators (e.g., speakers, haptic vibrators, and so forth) each coupled to an output of a respective amplifier, a portable energy source, and an intelligent current limiter. The portable energy source is configured to supply power to the amplifier(s). The intelligent current limiter is configured to determine a power consumption limit based on a portable energy source voltage of the portable energy source, a portable energy source current limit defined by a portable energy source current budget for operation of the amplifier(s), and an efficiency of each respective amplifier; determine a predicted power consumption by each amplifier based on the digital signal received at the respective digital signal processor of that amplifier, a gain of each amplifier, and an admittance of the respective output generator of that amplifier; determine a combined predicted power consumption based on the respective predicted power consumptions, compare the combined predicted power consumption with the power consumption limit, and adjust at least one of a gain setting at one or more of the digital signal processors based on the comparison prior to supplying the digital audio signals to the respective amplifiers.

In one embodiment, the mobile computing device can include a first digital signal processor configured to receive a first digital signal, a first amplifier, and a first output generator coupled to an output of the first amplifier. The mobile computing device further includes a second digital signal processor configured to receive a second digital signal, a second amplifier, and a second output generator coupled to an output of the second amplifier. The portable energy source is configured to supply power to at least the first amplifier and the second amplifier. The intelligent current limiter is configured to determine a power consumption limit based on a portable energy source voltage of the portable energy source, a portable energy source current limit defined by a portable energy source current budget for operation of the first amplifier and the second amplifier, an efficiency of the first amplifier, and an efficiency of the second amplifier; determine a first predicted power consumption by the first amplifier based on the first digital signal received at the first digital signal processor, a gain of first amplifier, and an admittance of first output generator; determine a second predicted power consumption by the second amplifier based on the second digital signal received at the second digital signal processor, a gain of the second amplifier, and an admittance of the second output generator; determine a combined predicted power consumption based on the first and second predicted power consumptions, compare the combined predicted power consumption with the power consumption limit, and adjust at least one of a gain setting at the first digital signal processor and a gain setting at the second digital signal processor based on the comparison prior to supplying the first digital signal to the first amplifier and the second digital signal to the second amplifier.

The mobile computing device may, in an example embodiment, include an audio system, a haptic system, a portable energy source, and an intelligent current limiter. The audio system includes an audio digital signal processor configured to receive a digital audio signal, an audio amplifier, and a speaker coupled to an output of the audio amplifier. The haptic system includes a haptic digital signal processor configured to receive a digital haptic signal, a haptic amplifier, and a haptic vibrator coupled to an output of the haptic amplifier. The portable energy source is configured to supply power to at least the audio amplifier and the haptic amplifier. The intelligent current limiter is configured to determine a power consumption limit based on a portable energy source voltage of the portable energy source, a portable energy source current limit defined by a portable energy source current budget for operation of the audio amplifier and the haptic amplifier, an efficiency of the audio amplifier and an efficiency of the haptic amplifier; determine a first predicted power consumption by the audio amplifier based on the digital audio signal received at the audio digital signal processor, a gain of the audio amplifier, and an admittance of the speaker; determine a second predicted power consumption by the haptic amplifier based on the digital haptic signal received at the haptic digital signal processor, a gain of the haptic amplifier, and an admittance of the haptic vibrator; determine a combined predicted power consumption based on the first and second predicted power consumptions; compare the combined predicted power consumption with the power consumption limit; and adjust at least one of a gain setting at the audio digital signal processor and a gain setting at the haptic digital signal processor based on the comparison prior to supplying the digital audio signal to the audio amplifier and the digital haptic signal to the haptic amplifier.

In embodiments, the intelligent current limiter may be implemented as part of the digital signal processor for a mobile computing device. In such embodiments, the digital signal processor includes at least one processor and at least one memory comprising computer program code, the at least one memory and the computer program code configured to, with the at least one processor, to cause the intelligent current limiter to determine predicted power consumptions by one or more amplifiers based on a digital audio signal received by the amplifier, a gain of the amplifier, and an admittance of an output generator coupled with the amplifier; determine a combined predicted power consumption based on the predicted power consumptions; determine a power consumption limit based on a battery voltage of a battery configured to supply power to the amplifier(s), a battery current limit associated with the battery and defined by a battery current budget for operation of the amplifier(s), an efficiency of the amplifier(s); compare the combined predicted power consumption with the power consumption limit, and adjust a gain setting of one or more of the digital signal processors based on the comparison prior to supplying the digital signal(s) to the amplifier(s).

In an example embodiment, a digital signal processor for a mobile computing device having an audio system and a haptic system includes an intelligent current limiter. The digital signal processor includes at least one processor and at least one memory comprising computer program code, the at least one memory and the computer program code configured to, with the at least one processor, to cause the intelligent current limiter to: determine a first predicted power consumption by an audio amplifier based on a digital audio signal received at an audio system, a gain of the audio amplifier, and an admittance of a speaker coupled to the audio amplifier; determine a second predicted power consumption by a haptic amplifier based on a digital haptic signal received at a haptic system, a gain of the haptic amplifier, and an admittance of a haptic vibrator coupled to the haptic amplifier; determine a combined predicted power consumption based on the first and second predicted power consumptions; determine a power consumption limit based on a battery voltage of a battery configured to supply power to the audio amplifier and the haptic amplifier, a battery current limit associated with the battery and defined by a battery current budget for operation of the audio amplifier and the haptic amplifier, an efficiency of the audio amplifier and an efficiency of the haptic amplifier, compare the combined predicted power consumption with the power consumption limit, and adjust at least one of a gain setting of the audio digital signal processor and a gain setting of the haptic digital signal processor based on the comparison prior to supplying the digital audio signal to the audio amplifier and the digital haptic signal to the haptic amplifier.

Example Implementations

Figure 1:
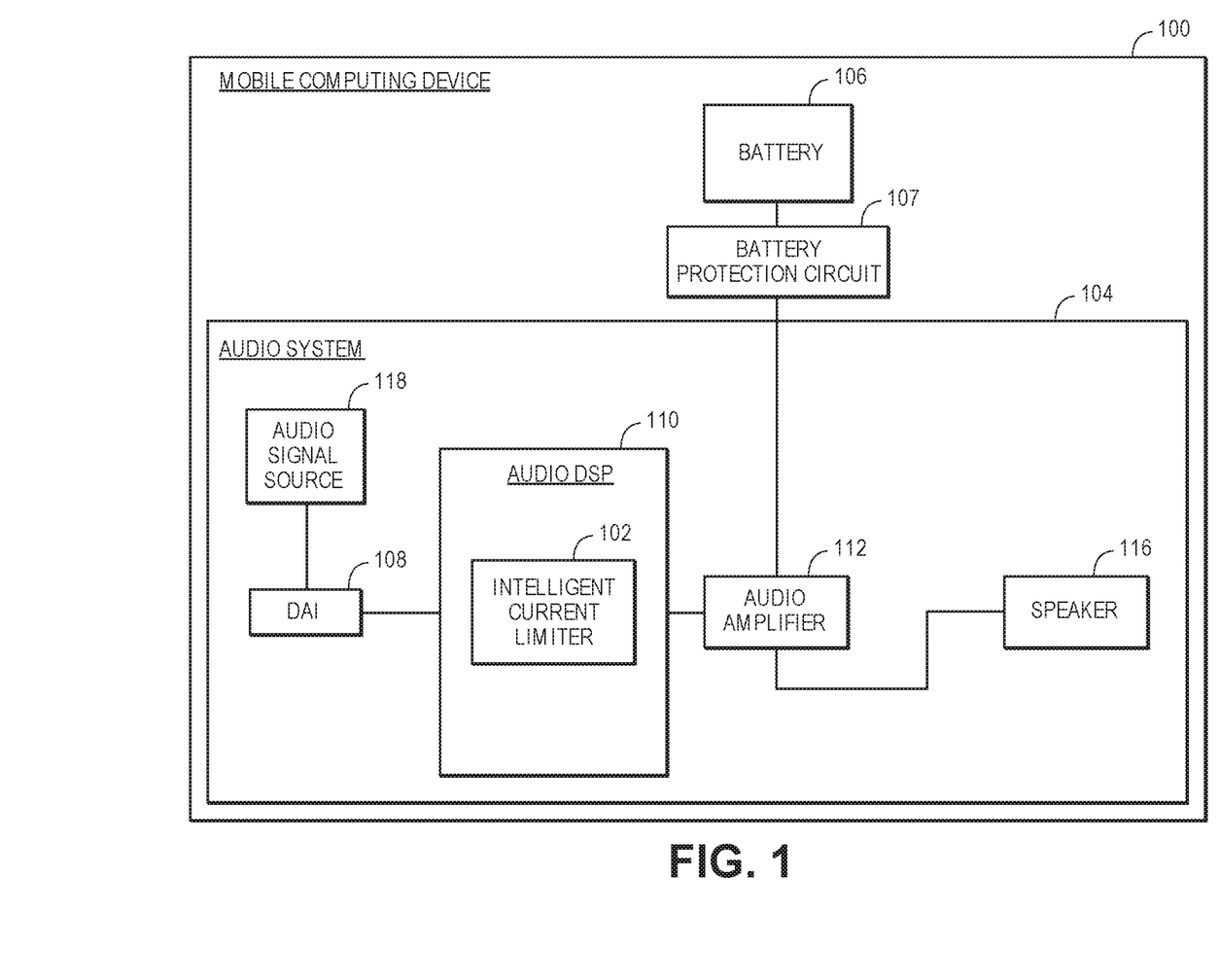
FIG. 1 is a block diagram representation of an example of a mobile computing device including an embodiment an intelligent current limiter.

Referring to FIG. 1, a block diagram representation of an example of a mobile computing device 100 including an embodiment an intelligent current limiter 102 is shown. The mobile computing device 100 includes an audio system 104, a battery 106, and a battery protection circuit 107. The mobile computing device 100 includes additional components that facilitate operation of the mobile computing device 100 (not shown in FIG. 1). Examples of mobile computing devices 100 include but are not limited to a smart phone, a tablet, and a laptop.

The audio system 104 generally includes a digital audio interface (DAI) 108, an audio digital signal processor (DSP) 110, an audio amplifier 112, and a speaker 116. In an embodiment, the intelligent current limiter 102 is stored at the mobile computing device 100. In an embodiment, the intelligent current limiter 102 stored at the audio DSP 110.

In an embodiment, the DAI 108 is configured to be communicatively coupled to an audio signal source 118. In an embodiment, the DAI 108 is communicatively coupled to an audio signal source 118. The DAI 108 receives digital audio signals from the audio signal source 118. An example a of audio signal source 118 is a media player.

The audio DSP 110 is communicatively coupled to the DAI 108. The audio DSP 110 receives the digital audio signals as an input and digitally processes the received digital audio signals. The audio amplifier 112 is communicatively coupled to the audio DSP 110 and receives the digital audio signals from the audio DSP 110 for amplification. The audio amplifier 112 has a fixed gain. The audio amplifier 112 amplifies the received digital audio signals in accordance with the fixed gain. The audio amplifier 112 transmits the amplified audio signals to the speaker 116. The speaker 116 broadcasts the received audio signals.

While different components of the audio system 104 have been described, alternative embodiments of the audio system 104 may include additional components that facilitate the operation of the audio system 104.

The battery protection circuit 107 is disposed between the battery 106 and the audio amplifier 112. The battery protection circuit 107 protects the battery 106 from overload conditions. The battery 106 has a shutdown threshold current. In the event the amount of battery current drawn from the battery 106 exceeds the shutdown threshold current, the battery protection circuit 107 is triggered and shuts down the battery 106. In an embodiment, the battery protection circuit 107 disconnects the battery 106 from the systems powered by the battery 106 thereby shutting down the battery 106. While a battery 106 has been described as a power source used to power the audio amplifier 112, other types of portable energy sources may be used. For example, a photovoltaic cell system may be used to supply power to the audio amplifier 112.

The battery 106 supplies battery current $I_{BAT}$ to the audio amplifier 112. The mobile computing device 100 has a battery current budget $I_{BAT(LIM)}$ allocated for the operation of the audio amplifier 112. If the audio amplifier 112 draws battery current $I_{BAT}$ from the battery 106 during the amplification of the digital audio signals that exceeds the allocated battery current budget $I_{BAT(LIM)}$, the total amount of current drawn from the battery 106 may exceed the shutdown threshold current and trigger the battery protection circuit 107 to shut down the battery 106.

The audio DSP 110 has an adjustable gain setting. In an embodiment, the default gain setting of the audio DSP 110 is one. The audio DSP 110 applies the gain to the received digital audio signals in accordance with the gain setting. The intelligent current limiter 102 manages the gain setting of the audio DSP 110 and the audio DSP applies the gain to the received digital audio signals prior to the transmission of the digital audio signals to the audio amplifier 112 for amplification to ensure that the audio amplifier 112 does not draw battery current $I_{BAT}$ from the battery 106 that exceeds the battery current budget $I_{BAT(LIM)}$ allocated for the operation of the audio amplifier 112.

Figure 2:
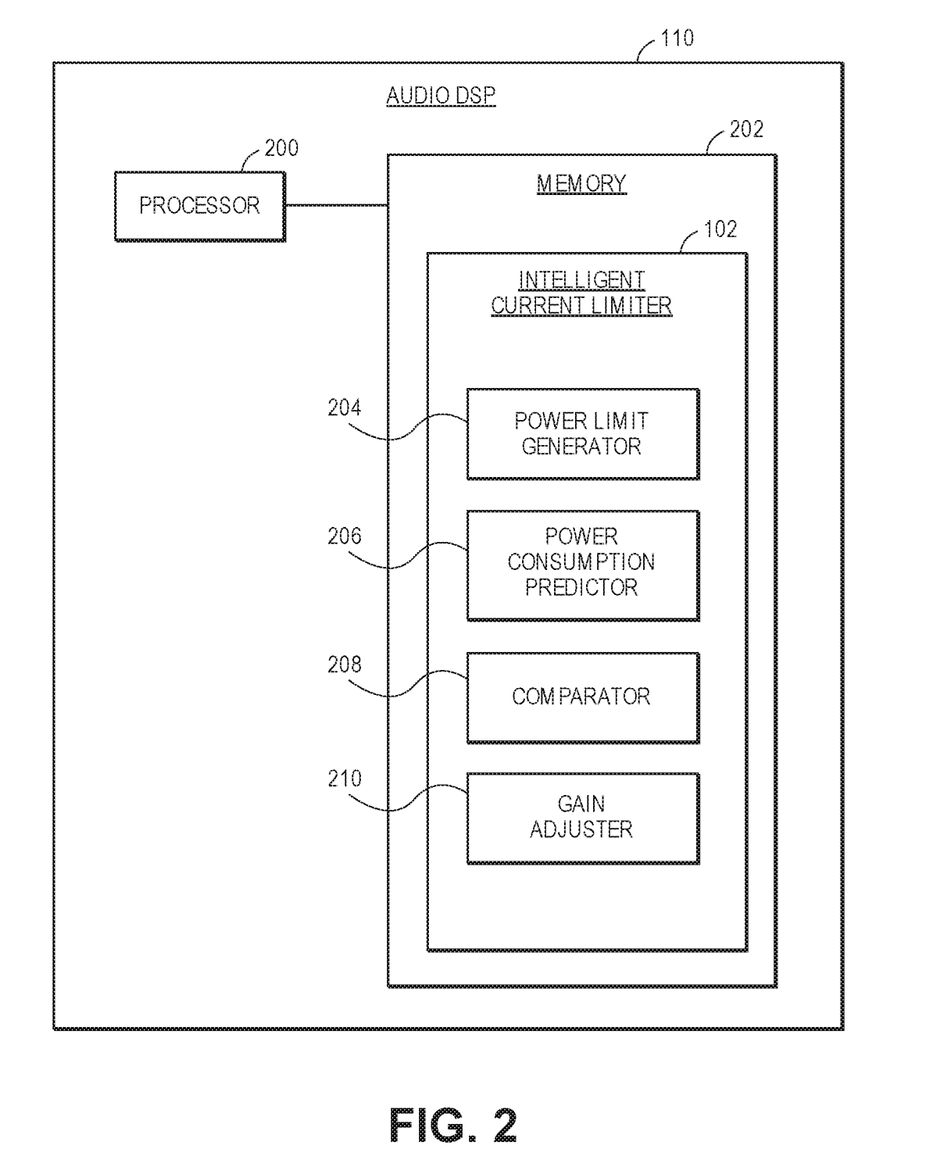
FIG. 2 is a block diagram representation of an example of an audio digital signal processor including an embodiment of an intelligent current limiter.

Referring to FIG. 2, a block diagram representation of an example audio DSP 110 including an embodiment of an intelligent current limiter 102 is shown. The audio DSP 110 includes at least one processor 200 and at least one memory 202. In an embodiment the intelligent current limiter 102 is stored in the at least one memory 202. The intelligent current limiter 102 includes a power limit generator 204, a power consumption predictor 206, a comparator 208, and a gain adjuster 210.

The intelligent current limiter 102 operates on a real time basis. The intelligent current limiter 102 analyzes the digital audio signals as they are received at the audio DSP 110, adjusts the gain setting at the audio DSP 110, if needed, and applies the gain at the audio DSP 110 to the received digital audio signals prior to supplying the digital audio signals to the audio amplifier 112 for amplification.

The power limit generator 204 determines the power consumption limit $P_{AMP(LIM)}$ for the audio amplifier 112 based on the battery voltage $V_{BAT}$ of the battery 106, the battery current budget $I_{BAT(LIM)}$ allocated for the operation of the audio amplifier 112, and an efficiency $Eff_{AMP}$ of the audio amplifier 112. The derivation of the relationship between the power consumption limit $P_{AMP(LIM)}$ for the audio amplifier 112 based on the battery voltage $V_{BAT}$ of the battery 106, the battery current budget $I_{BAT(LIM)}$ allocated for the operation of the audio amplifier 112, and the efficiency $Eff_{AMP}$ of the audio amplifier 112 is detailed below.

Equation 1 defines the relationship between the power $P_{BAT}$ drawn from the battery 106 by the audio amplifier 112, the battery voltage $V_{BAT}$ of the battery 106, and the battery current $I_{BAT}$ drawn from the battery 106 by the audio amplifier 112.

$$P_{BAT}=(V_{BAT})(I_{BAT}) \qquad \text{Equation 1:}$$

As mentioned above, a battery current budget $I_{BAT(LIM)}$ of the battery 106 is allocated for the operation of the audio amplifier 112 and is a known parameter. The battery voltage $V_{BAT}$ of the battery 106 is a known parameter. As shown in Equation 2 below, substituting the value of the battery current budget $I_{BAT(LIM)}$ for the battery current $I_{BAT}$ enables the derivation of the battery power budget $P_{BAT(LIM)}$ allocated for the operation of the audio amplifier 112.

$$P_{BAT(LIM)}=(V_{BAT})(I_{BAT(LIM)}) \qquad \text{Equation 2:}$$

Equation 3 defines the relationship between the power $P_{AMP}$ consumed by the audio amplifier 112, the voltage $V_{AMP}$ across the speaker 116, and the current $I_{AMP}$ fed to the speaker 116.

$$P_{AMP}=(V_{AMP})(I_{AMP}) \qquad \text{Equation 3:}$$

Equation 4 defines the relationship between the efficiency $Eff_{AMP}$ of the audio amplifier 112, the power $P_{BAT}$ drawn from the battery 106 to drive the audio amplifier 112 and the power $P_{AMP}$ consumed by the audio amplifier 112. The efficiency $Eff_{AMP}$ of the audio amplifier 112 reflects losses associated with the operation of the audio amplifier 112.

$$Eff_{AMP}=P_{AMP}/P_{BAT} \qquad \text{Equation 4:}$$

Accordingly, the power $P_{AMP}$ consumed by the audio amplifier 112 can be represented by Equation 5.

$$P_{AMP}=(Eff_{AMP})(P_{BAT}) \qquad \text{Equation 5:}$$

The relationship illustrated in Equation 5 can be used to derive the power consumption limit $P_{AMP(LIM)}$ for the audio amplifier 112 based on the battery power budget $P_{BAT(LIM)}$ of the battery 106 allocated for the operation of the audio amplifier 112, and the efficiency $Eff_{AMP}$ of the audio amplifier 112 as shown in Equation 6. More specifically, the power consumption limit $P_{AMP(LIM)}$ for the audio amplifier 112 is substituted for the parameter representative of the power $P_{AMP}$ consumed by the audio amplifier 112 and the battery power budget $P_{BAT(LIM)}$ allocated for the operation of the audio amplifier 112 is substituted for the parameter representative of the power $P_{BAT}$ drawn from the battery 106 to drive the audio amplifier 112.

$$P_{AMP(LIM)} = (\text{Eff}_{AMP})(P_{BAT(LIM)}) \qquad \text{Equation 6:}$$

As shown in Equation 2 above, the battery power budget $P_{BAT(LIM)}$ associated with the operation of the audio amplifier 112 is a product of the battery voltage $V_{BAT}$ of the battery 106 and the battery current budget $I_{BAT(LIM)}$ of the battery 106 allocated for the operation of the audio amplifier 112. The battery power budget $P_{BAT(LIM)}$ is replaced with the product of the battery voltage $V_{BAT}$ and the battery current budget $I_{BAT(LIM)}$ in Equation 7 below.

$$P_{AMP(LIM)} = (\text{Eff}_{AMP})(V_{BAT})(I_{BAT(LIM)}) \qquad \text{Equation 7:}$$

The efficiency $\text{Eff}_{AMP}$ of the audio amplifier 112, the battery voltage $V_{BAT}$ of the battery 106 and the battery current budget $I_{BAT(LIM)}$ allocated for the operation of the audio amplifier 112 are known parameters. The power limit generator 204 determines the power consumption limit $P_{AMP(LIM)}$ for the audio amplifier 112 based on the amplifier efficiency $\text{Eff}_{AMP}$ of the audio amplifier 112, the battery voltage $V_{BAT}$ of the battery 106, and the battery current budget $I_{BAT(LIM)}$ allocated for the operation of the audio amplifier 112 using the relationship defined in Equation 7 above.

The power consumption predictor 206 predicts the power $P_{AMP(PRED)}$ that is expected to be consumed by the audio amplifier 112 based on the gain $GAIN_{AMP}$ of the audio amplifier 112 in connection with the amplification of the digital audio signals prior to supplying the digital audio signals to the audio amplifier 112. More specifically, the power consumption predictor 206 predicts the power $P_{AMP(PRED)}$ that is expected to be consumed by the audio amplifier 112 based on a voltage $V_{DAI}$ of the digital audio signals received at the DAI 108, the gain $GAIN_{AM}$ of the audio amplifier 112, and an admittance $ADM_{SPEAKER}$ of the speaker 116. The admittance $ADM_{SPEAKER}$ of the speaker 116 is a known parameter that varies as a function of the frequency of the digital audio signals received at the DAI 108.

The derivation of the relationship between the predicted power $P_{AMP(PRED)}$ that is expected to be consumed by the audio amplifier 112 based on a voltage $V_{DAI}$ of the digital audio signals received at the DAI 108, the gain $GAIN_{AMP}$ of the audio amplifier 122, and an admittance $ADM_{SPEAKER}$ of the speaker 116 is detailed below.

Equation 3, reproduced below, established the relationship between the power $P_{AMP}$ consumed by the audio amplifier 112, the voltage $V_{AMP}$ across the speaker 116, and the current $I_{AMP}$ fed to the speaker 116.

$$P_{AMP} = (V_{AMP})(I_{AMP}) \qquad \text{Equation 3:}$$

The relationship illustrated in Equation 3 can be used to derive the relationship between the predicted power $P_{AMP(PRED)}$ that is expected to be consumed by the audio amplifier 112 to amplify the digital audio signals received at the DAI 108, the predicted voltage $V_{AMP(PRED)}$ across the speaker 116, and the predicted current $I_{AMP(PRED)}$ fed to the speaker 116. More specifically, the predicted power $P_{AMP(PRED)}$ that is expected to be consumed by the audio amplifier 112 having the gain $GAIN_{AMP}$ is substituted for the parameter representative of the power $P_{AMP}$ consumed by the audio amplifier 112, the predicted voltage $V_{AMP(PRED)}$ across the speaker 116 is substituted for the parameter representative of the voltage $V_{AMP}$ across the speaker 116 and the predicted current $I_{AMP(PRED)}$ fed to the speaker 116 is substituted for the parameter representative of the current LIMP fed to the speaker 116 as shown in Equation 8 below $$P_{AMP(PRED)} = (V_{AMP(PRED)})(I_{AMP(PRED)}) \qquad \text{Equation 8:}$$

Equation 9 illustrates the relationship between the predicted voltage $V_{AMP(PRED)}$ across the speaker 116 as a function of the voltage $V_{DAI}$ of the digital audio signal received at the DAI 108 and the gain $GAIN_{AMP}$ of the audio amplifier 112.

$$V_{AMP(PRED)} = (V_{DAI})(GAIN_{AMP}) \qquad \text{Equation 9:}$$

Equation 10 illustrates the relationship between the predicted current $I_{AMP(PRED)}$ fed to the speaker 116, the predicted voltage $V_{AMP(PRED)}$ across the speaker 116, and the admittance $ADM_{SPEAKER}$ of the speaker 116, where the admittance $ADM_{SPEAKER}$ of the speaker 116 varies as a function of the frequency of the digital audio signal received at the DAI 108.

$$I_{AMP(PRED)} = (V_{AMP(PRED)})(ADM_{SPEAKER}) \qquad \text{Equation 10:}$$

The predicted voltage $V_{AMP(PRED)}$ across the speaker 116 was defined in Equation 9 as the product of the voltage $V_{DAI}$ of the digital audio signal received at the DAI 108 and the gain $GAIN_{AMP}$ of the audio amplifier 112. The parameter for the predicted voltage $V_{AMP(PRED)}$ across the speaker 116 is Equation 10 is replaced with the product of the voltage $V_{DAI}$ of the digital audio signal received at the DAI 108 and the gain $GAIN_{AMP}$ of the audio amplifier 112 in Equation 11.

$$I_{AMP(PRED)} = (V_{DAI})(GAIN_{AMP})(ADM_{SPEAKER}) \qquad \text{Equation 11:}$$

As established by Equation 8 above, the predicted power $P_{AMP(PRED)}$ that is expected to be consumed by the audio amplifier 112 to process the digital audio signals received at the DAI 108 is a product of the predicted voltage $V_{AMP(PRED)}$ across the speaker 116 and the predicted current $I_{AMP(PRED)}$ fed by the audio amplifier 112 to the speaker 116. Equation 12 is generated by replacing the predicted voltage $V_{AMP(PRED)}$ across the speaker 116 with the product of the voltage $V_{DAI}$ of the digital audio signal received at the DAI 108 and the gain $GAIN_{AMP}$ of the audio amplifier 112 (See Equation 9) and replacing the predicted current $I_{AMP(PRED)}$ fed to the speaker 116 with the product of the voltage $V_{DAI}$ of the digital audio signal received at the DAC 108, the gain $GAIN_{AMP}$ of the audio amplifier 112, and the admittance $ADM_{SPEAKER}$ of the speaker 116 (See Equation 11).

$$P_{AMP(PRED)} = (V_{DAI})(GAIN_{AMP})(V_{DAI})(GAIN_{AMP})(ADM_{SPEAKER}) \qquad \text{Equation 12:}$$

The voltage $V_{DAI}$ of the digital audio signal received at the DAI 108, the gain $GAIN_{AMP}$ of the audio amplifier 112 and the admittance $ADM_{SPEAKER}$ of the speaker 116 associated with the frequency of the digital audio signal are known parameters. The power consumption predictor 206 predicts the power $P_{AMP(PRED)}$ that is expected to be consumed by the audio amplifier 122 based voltage $V_{DAI}$ of the digital audio signal received at the DAI 108, the gain $GAIN_{AMP}$ of the audio amplifier 112, and the admittance $ADM_{SPEAKER}$ of the speaker 116 associated with the frequency of the digital audio signal using the relationship defined in Equation 12 above, prior to supplying the digital audio signals to the audio amplifier 122 for amplification.

As described above, the power limit generator 204 determines the power consumption limit $P_{AMP(LIM)}$ for the audio amplifier 112 based on the battery voltage $V_{BAT}$ of the battery 106, the battery current budget $I_{BAT(LIM)}$ allocated for the operation of the audio amplifier 112, and the efficiency $Eff_{AMP}$ of the audio amplifier 112. The power consumption predictor 206 predicts the power $P_{AMP(PRED)}$ that is expected to be consumed by the audio amplifier 112 having a gain $GAIN_{AMP}$ to amplify the digital audio signals receive at the DAI 108 prior to supplying the digital audio signals to the audio amplifier 112.

The comparator 208 compares the predicted power $P_{AMP(PRED)}$ expected to be consumed by the audio amplifier 112 having a gain $GAIN_{AMP}$ with the power consumption limit $P_{AMP(LIM)}$ for the audio amplifier 112 to determine whether the predicted power $P_{AMP(PRED)}$ consumption by the audio amplifier 112 exceeds the power consumption limit $P_{AMP(LIM)}$ for the audio amplifier 112.

If the comparator 208 determines that the predicted power $P_{AMP(PRED)}$ consumption by the audio amplifier 112 exceeds the power consumption limit $P_{AMP(LIM)}$ for the audio amplifier 112, the gain adjuster 210 decreases the gain setting at the audio DSP 110 to ensure that the power consumed by the audio amplifier 112 does not exceed the power consumption limit $P_{AMP(LIM)}$ for the audio amplifier 112. When the gain setting at the audio DSP 110 is decreased, the audio DSP 110 attenuates the received digital audio signals prior to supplying the digital audio signals to the audio amplifier 112 for amplification.

In an embodiment, if the comparator 208 determines that the predicted power $P_{AMP(PRED)}$ consumption by the audio amplifier 112 does not exceed the power consumption limit $P_{AMP(LIM)}$ for the audio amplifier 112, the gain adjuster 210 maintains the gain setting at the audio DSP 110 at the default gain setting.

The intelligent current limiter 102 operates on a real time basis. The intelligent current limiter 102 analyzes the digital audio signals as they are received at the audio DSP 110, adjusts the gain setting at the audio DSP 110, if needed, and applies the gain to the digital audio signals at the audio DSP 110 prior to supplying the digital audio signals to the audio amplifier 112.

While audio DSP 110 functions associated with the performance of the intelligent current limiter 102 have been described above, the audio DSP 110 performs other digital signal processing functions in connection with the received digital audio signals.

Figure 3:
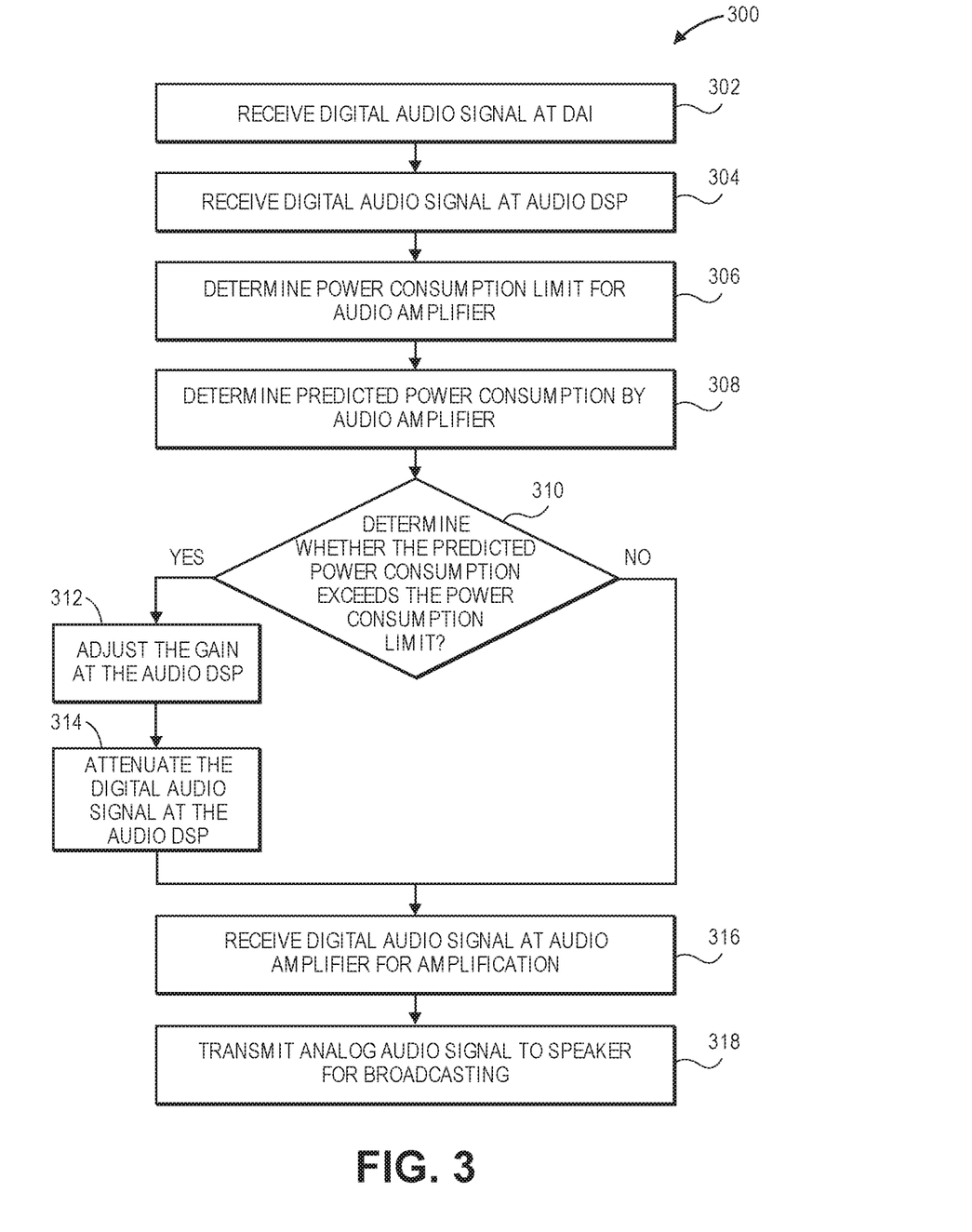
FIG. 3 is a flow diagram representation of an embodiment of a method of intelligently limiting the current supplied to an example audio amplifier using an embodiment of an intelligent current limiter.

Referring to FIG. 3, a flow chart representation of a method 300 of implementing an embodiment of an intelligent current limiter 102 in a mobile computing device 100 is shown. A digital audio signal is received at the DAI 108 from the audio signal source 118 at 302. The digital audio signal is received at the audio DSP 110 at 304. The intelligent current limiter 102 determines the power consumption limit $P_{AMP(LIM)}$ for the audio amplifier 112 based on the battery voltage $V_{BAT}$ of the battery 106, the battery current budget $I_{BAT(LIM)}$ allocated for the operation of the audio amplifier 112, and the efficiency $Eff_{AMP}$ of the audio amplifier 112 at 306. The intelligent current limiter 102 predicts the power $P_{AMP(PRED)}$ that is expected to be consumed by the audio amplifier 112 having a gain $GAIN_{AMP}$ to amplify the digital audio signals at 308.

The intelligent current limiter 102 determines whether the predicted power $P_{AMP(PRED)}$ consumption by the audio amplifier 112 having a gain $GAIN_{AMP}$ exceeds the power consumption limit $P_{AMP(LIM)}$ for the audio amplifier 112 at 310. If the intelligent current limiter 102 determines that the predicted power $P_{AMP(PRED)}$ consumption by the audio amplifier 112 exceeds the power consumption limit $P_{AMP(LIM)}$ for the audio amplifier 112 at 310, the intelligent current limiter 102 decreases the gain setting at the audio DSP 110 to ensure that the power consumed by the audio amplifier 112 does not exceed the power consumption limit $P_{AMP(LIM)}$ for the audio amplifier 112 at 312. The audio DSP 110 attenuates the received digital audio signal in accordance with the adjusted gain setting at 314. Following the attenuation of the digital audio signal at the audio DSP 110, the digital audio signals are transmitted to the audio amplifier 112 for amplification at 316.

In an embodiment, if the intelligent current limiter 102 determines that the predicted power $P_{AMP(PRED)}$ consumption by the audio amplifier 112 does not exceed the power consumption limit $P_{AMP(LIM)}$ for the audio amplifier 112 at 310, the intelligent current limiter 102 maintains the default gain setting at the audio DSP 110 and the digital audio signals are transmitted to the audio amplifier 112 for amplification at 316.

The audio signals are transmitted from the audio amplifier 112 to the speaker for broadcasting at 318.

While a series of steps have been described in connection with the method 300, a fewer number of the described steps and/or additional steps may be performed. Furthermore, while the steps have been described in a particular order, the steps in method 300 may be performed in a different order.

Figure 4:
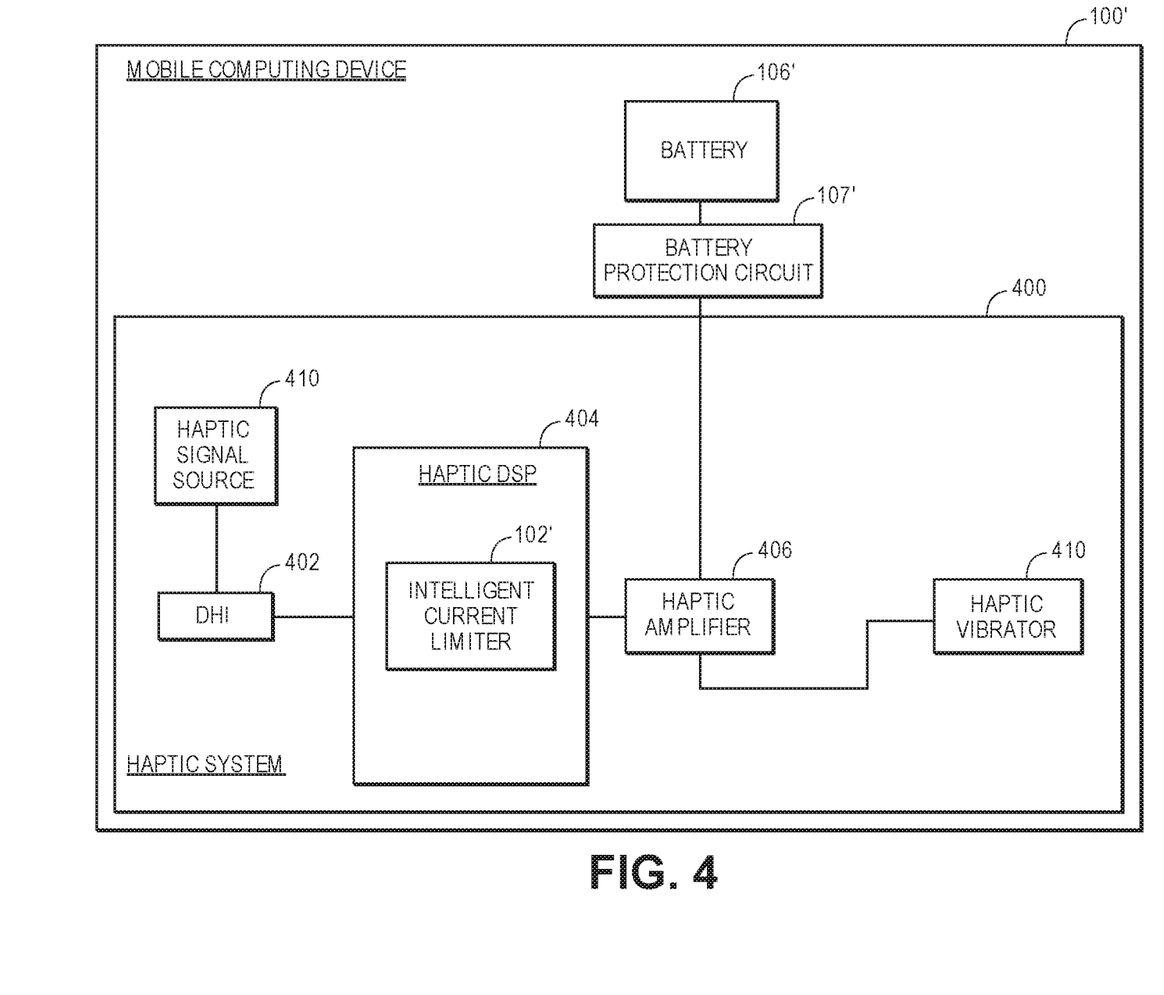
FIG. 4 is a block diagram representation of an example of a mobile computing device including an embodiment an intelligent current limiter.

Referring to FIG. 4, a block diagram representation of an example of a mobile computing device 100' including an embodiment an intelligent current limiter 102' is shown. The mobile computing device 100' includes a haptic system 400, a battery 106', and a battery protection circuit 107'. The mobile computing device 100' includes additional components that facilitate operation of the mobile computing device 100' (not shown in FIG. 4). Examples of mobile computing devices 100' include but are not limited to a smart phone, a tablet, and a laptop.

The haptic system 400 generally includes a digital haptic interface (DHI) 402, a haptic DSP 404, a haptic amplifier 406, and a haptic vibrator 410. In an embodiment, the intelligent current limiter 102' is stored at the mobile computing device 100'. In an embodiment, the intelligent current limiter 102' stored at the haptic DSP 404. The DHI 402 is communicatively coupled to a haptic signal source 410. The DHI 402 receives digital haptic signals from the haptic signal source 410. The battery protection circuit 107' is disposed between the battery 106' and the haptic amplifier 406.

The haptic DSP 404 is communicatively coupled to the DHI 402. The haptic DSP 404 has an adjustable gain and receives the digital haptic signals for digital signal processing. The haptic amplifier 406 is communicatively coupled to the haptic DSP 404 and receives the digital haptic signals generated by the haptic DSP 404 for amplification. The haptic vibrator 410 receives the haptic signals from the haptic amplifier 406 and generates vibrations based on the received analog haptic signals. In embodiments, the haptic vibrator 410 may comprise a piezoelectric actuator, an eccentric rotating mass (ERM) motor, a linear resonant actuator (LRA), combinations thereof, and so forth.

The battery protection circuit 107' is disposed between the battery 106' and the audio amplifier 112' and between the battery 106' and the haptic amplifier 406. The battery protection circuit 107' protects the battery 106' from overload conditions. The battery 106' has a shutdown threshold current. In the event the amount of battery current drawn from the battery 106' exceeds the shutdown threshold current, the battery protection circuit 107' is triggered and shuts down the battery 106'. In an embodiment, the battery protection circuit 107' disconnects the battery 106' from the systems powered by the battery 106' thereby shutting down the battery 106'. While a battery 106' has been described as a power source used to power the audio amplifier 112' and the haptic amplifier 406, other types of portable energy sources may be used. For example, a photovoltaic cell system may be used to supply power to the audio amplifier 112' and the to the haptic amplifier 406.

While different components of the haptic system 400 have been described, alternative embodiments of the haptic system 400 may include additional components that facilitate the operation of the haptic system 400.

Figure 5:
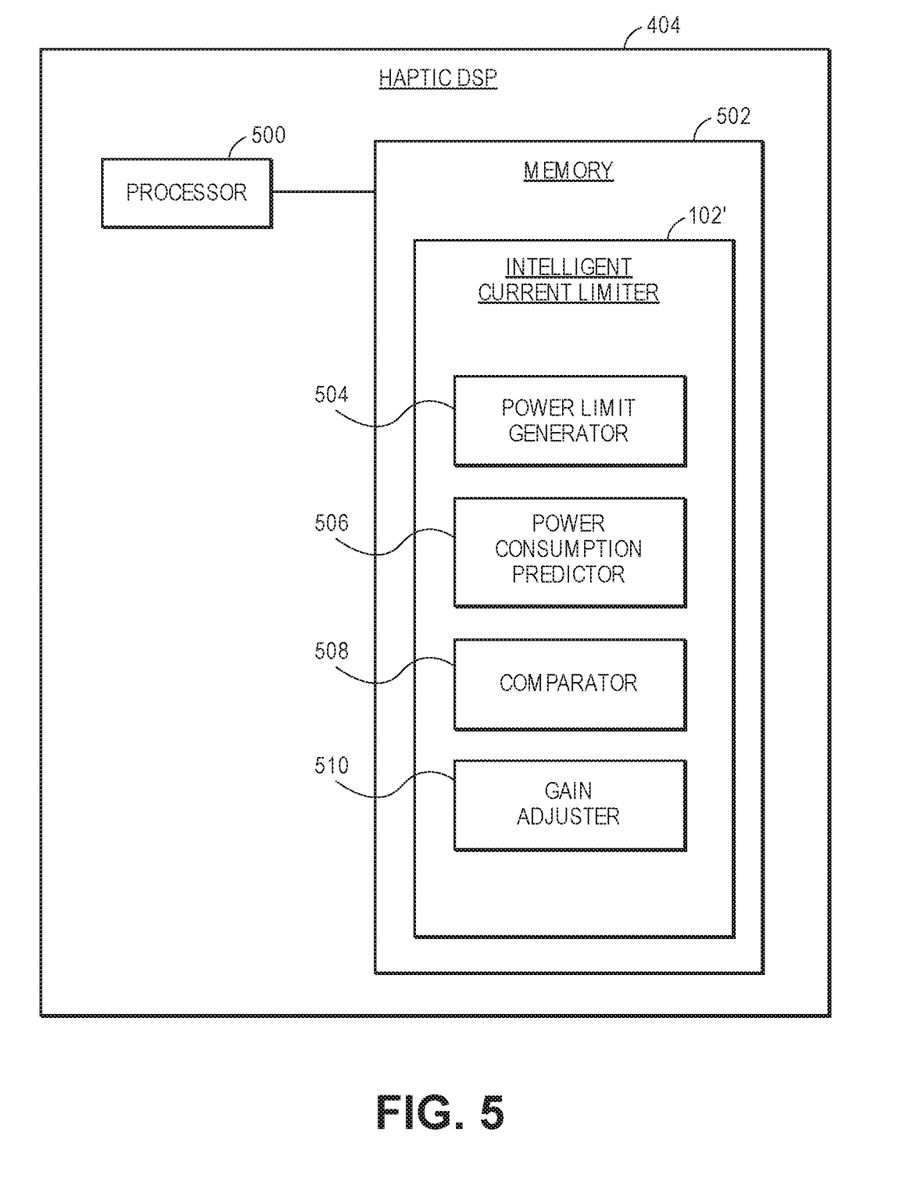
FIG. 5 is a block diagram representation of an example of a haptic digital signal processor including an embodiment of an intelligent current limiter.

Referring to FIG. 5, a block diagram representation of an example haptic DSP 404 including an embodiment of an intelligent current limiter 102' is shown. The haptic DSP 404 includes at least one processor 500 and at least one memory 502. In an embodiment the intelligent current limiter 102' is stored in the at least one memory 502. The intelligent current limiter 102' includes a power limit generator 504, a power consumption predictor 506, a comparator 508, and a gain adjuster 510.

The intelligent current limiter 102' operates on a real time basis. The intelligent current limiter 102' analyzes the digital haptic signals as they are received at the haptic DSP 404, adjusts a gain setting at the haptic DSP 404, if needed, and applies the gain at the haptic DSP 404 prior to supplying the digital haptic signals to the haptic amplifier 406.

The power limit generator 504 determines the power consumption limit $P_{AMP(LIM)}'$ for the haptic amplifier 406 based on the battery voltage V BAT' of the battery 106', the battery current budget $I_{BAT(LIM)}'$ allocated for the operation of the haptic amplifier 406, and the efficiency $\text{Eff}_{AMP}'$ of the haptic amplifier 406. The relationship between these parameters can be derived in a manner similar to that used to derive the relationship between analogous parameters for the audio system 104 described above and is defined by Equation 13 below.

$$P_{AMP(LIM)}' = (\text{Eff}_{AMP}')(V_{BAT}')(I_{BAT(LIM)}')) \quad \text{Equation 13:}$$

The efficiency $\text{Eff}_{Amp}'$ of the haptic amplifier 406, the battery voltage $V_{BAT}'$ of the battery 106' and the battery current budget $I_{BAT(LIM)}'$ allocated for the operation of the haptic amplifier 406 are known parameters. The power limit generator 504 determines the power consumption limit $P_{AMP(LIM)}'$ for the haptic amplifier 406 based on the amplifier efficiency $\text{Eff}_{AMP}'$ of the haptic amplifier 406, the battery voltage $V_{BAT}'$ of the battery 106', and the battery current budget $I_{BAT(LIM)}'$ allocated for the operation of the haptic amplifier 406.

The power consumption predictor 506 predicts the power $P_{AMP(PRED)}'$ that is expected to be consumed by the haptic amplifier 406 having a gain $\text{GAIN}_{AMP}'$ in connection with the amplification of the digital haptic signals prior to supplying the digital haptic signals to the haptic amplifier 406. More specifically, the power consumption predictor 506 predicts the power $P_{AMP(PRED)}'$ that is expected to be consumed by the haptic amplifier 406 based on a voltage $V_{DHI}$ of the digital haptic signals received at the DSP 404, the gain $\text{GAIN}_{AMP}'$ of the haptic amplifier 406, and an admittance $\text{ADM}_{VIBRATOR}$ of the haptic vibrator 410. The admittance $\text{ADM}_{VIBRATOR}$ of the haptic vibrator 410 is a known parameter that varies as a function of the frequency of the digital haptic signals received at the DHI 402.

The relationship between these parameters can be derived in a manner similar to that used to derive the relationship between analogous parameters for the audio system 104 described above and is defined by Equation 14 below. The voltage $V_{DHI}$ of the digital haptic signal received at the DHI 402, the gain of the haptic amplifier 406 $\text{GAIN}_{AMP}$ and the admittance $\text{ADM}_{VIBRATOR}$ of the haptic vibrator 410 associated with the frequency of the digital haptic signal are known parameters.

$$P_{AMP(PRED)}'(V_{DHI})(\text{GAIN}_{AMP}')(V_{DHI})(\text{GAIN}_{AMP}')(\text{ADM}_{VIBRATOR}) \quad \text{Equation 14:}$$

The comparator 508 compares the predicted power $P_{AMP(PRED)}'$ consumption by the haptic amplifier 406 with the power consumption limit $P_{AMP(LIM)}'$ for the haptic amplifier 406 to determine whether the predicted power $P_{AMP(PRED)}'$ consumption exceeds the power consumption limit $P_{AMP(LIM)}'$.

If the comparator 208 determines that the predicted power $P_{AMP(PRED)}'$ consumption by the haptic amplifier 406 exceeds the power consumption limit $P_{AMP(LIM)}'$ for the haptic amplifier 406, the gain adjuster 510 decreases the gain at the haptic DSP 404 to ensure that the power consumed by the haptic amplifier 406 does not exceed the power consumption limit $P_{AMP(LIM)}'$. In an embodiment, the gain at the haptic DSP 404 has a default setting of one. The gain adjuster 510 decreases the gain setting at haptic DSP 404 and attenuates received digital haptic signals at the haptic DSP 404 in accordance with the adjusted gain setting prior to supplying the digital haptic signals to the haptic amplifier 406 for amplification.

In an embodiment, if the comparator 508 determines that the predicted power $P_{AMP(PRED)}'$ consumption by the haptic amplifier 406 does not exceed the power consumption limit $P_{AMP(LIM)}'$ for the haptic amplifier 406, the gain adjuster 510 maintains the gain setting at the haptic DSP 404 at the default gain setting.

The intelligent current limiter 102' operates on a real time basis. The intelligent current limiter 102' analyzes the digital haptic signals as they are received at the haptic DSP 404, adjusts the gain setting at the haptic DSP 404, if needed, and applies the adjusted gain to the digital haptic signals at the haptic DSP 404 prior to supplying the digital haptic signals to the haptic amplifier 406 for amplification.

While the haptic DSP functions associated with the performance of the intelligent current limiter 102' have been described above, the haptic DSP 404 performs other digital signal processing functions in connection with the received digital haptic signals.

Figure 6:
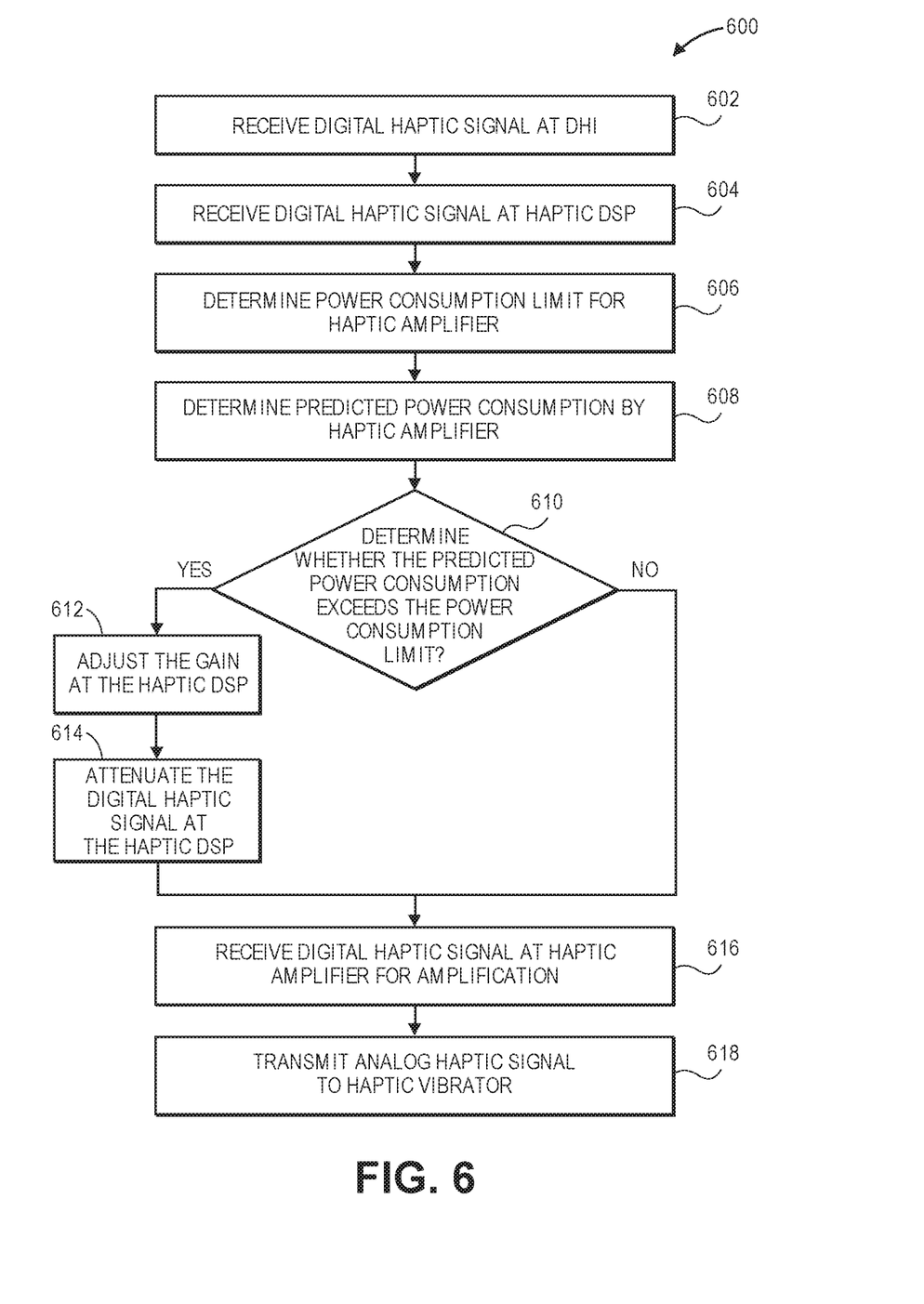
FIG. 6 is a flow diagram representation of an embodiment of a method of intelligently limiting the current supplied to an example haptic amplifier using an embodiment of an intelligent current limiter.

Referring to FIG. 6, a flow chart representation of a method 600 of implementing an embodiment of an intelligent current limiter 102' in a mobile computing device 100' is shown. A digital haptic signal is received at the DHI 402 from the haptic signal source 410 at 602. The digital haptic signal is received at the haptic DSP 404 for processing at 604. The intelligent current limiter 102' determines the power consumption limit $P_{AMP(LIM)}'$ for the haptic amplifier 406 based on the battery voltage $V_{BAT}'$ of the battery 106', the battery current budget $I_{BAT(LIM)}'$ allocated for the operation of the haptic amplifier 406, and the efficiency $\text{Eff}_{AMP}'$ of the haptic amplifier 406 at 606. The intelligent current limiter 102' predicts the power $P_{AMP(PRED)}'$ that is expected to be consumed by the haptic amplifier 406 having a gain of $\text{GAIN}_{AMP}'$ to amplify the digital haptic signals receive at the DHI 402 at 608.

The intelligent current limiter 102' determines whether the predicted power $P_{AMP(PRED)}'$ consumption by the haptic amplifier 406 having a gain of $\text{GAIN}_{AMP}'$ exceeds the power consumption limit $P_{AMP(LIM)}'$ for the haptic amplifier 406 at 610. If the intelligent current limiter 102' determines that the predicted power $P_{AMP(PRED)}'$ consumption by the haptic amplifier 406 exceeds the power consumption limit $P_{AMP(LIM)}'$ for the haptic amplifier 406 at 610, the gain adjuster 510 decreases the gain at the haptic DSP 404 to ensure that the power consumed by the haptic amplifier 406 does not exceed the power consumption limit $P_{AMP(LIM)}'$ for the haptic amplifier 406 at 612. The haptic DSP 404 attenuates the received haptic digital signal in accordance with the adjusted gain at 614. The attenuated haptic signals are received at the haptic amplifier 406 for amplification at 616.

In an embodiment, if the intelligent current limiter 102' determines that the predicted power $P_{AMP(PRED)}'$ consumption by the haptic amplifier 406 does not exceed the power consumption limit $P_{AMP(LIM)}'$ for the haptic amplifier 406 at 610, the gain adjuster 510 maintains the default gain setting at the haptic DSP 404. The digital haptic signals are received at the haptic amplifier 406 for amplification at 616.

The digital haptic signals are transmitted from the haptic amplifier 406 to the haptic vibrator 410 at 618.

While a series of steps have been described in connection with the method 600, a fewer number of the steps and/or additional steps may be performed. Furthermore, while the steps have been described in a particular order, the steps in method 600 may be performed in a different order.

Figure 7:
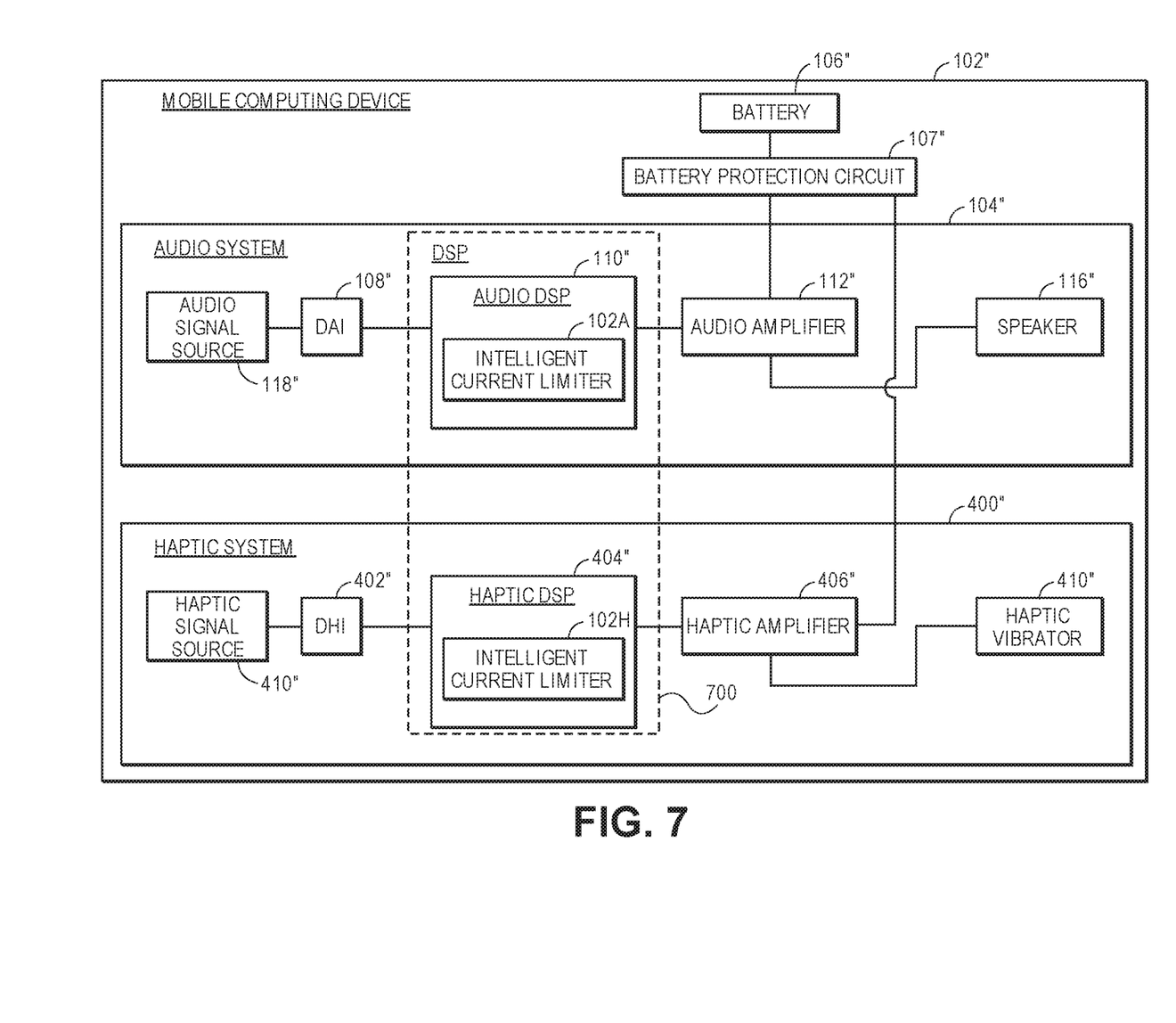
FIG. 7 is a block diagram representation of an example of a mobile computing device including an embodiment of a intelligent current limiter.

Referring to FIG. 7, a block diagram representation of an example of a mobile computing device 100" including an embodiment of an intelligent current limiter 102" is shown. The mobile computing device 100" includes two digital output systems. More specifically, in the embodiment shown, the computing device 100" includes an audio system 104" and a haptic system 400". However, it is contemplated that the mobile computing device 100" may include other types of digital output systems, and/or may include three or more digital output systems, in a variety of combinations. The mobile computing device 100" further includes a battery 106" and a battery protection circuit 107". The audio system 104" is generally similar to the audio system 104 and operates in a manner similar to operation of the audio system 104 described above. The haptic system 400" is generally similar to the haptic system 400 and operates in a manner similar to the haptic system 400 described above.

The battery 106" supplies battery current $I_{BAT}"$ to the audio amplifier 112" and to the haptic amplifier 406". The battery protection circuit 107" is disposed between the battery 106" and both the audio amplifier 112" and the haptic amplifier 406". The battery protection circuit 107" protects the battery 106" from overload conditions. The battery 106" has a shutdown threshold current. In the event the amount of battery current drawn from the battery 106" exceeds the shutdown threshold current, the battery protection circuit 107" is triggered and shuts down the battery 106". In an embodiment, the battery protection circuit 107" disconnects the battery 106" from the systems powered by the battery 106" thereby shutting down the battery 106". While a battery 106" has been described as a power source used to power the audio amplifier 112" and the haptic amplifier 406", other types of portable energy sources may be used. For example, a photovoltaic cell system may be used to supply power to the audio amplifier 112" and to the haptic amplifier 406".

The mobile computing device 100" has a battery current budget $I_{BAT(LIM)}"$ allocated for the operation of both the audio amplifier 112" and the haptic amplifier 406". If the combination of the audio amplifier 112" and the haptic amplifier 406" draws battery current $I_{BAT}"$ from the battery 106" during the amplification of the digital audio signals and the digital haptic signals, respectively, that exceeds the allocated battery current budget $I_{BAT(LIM)}"$, the total amount of current drawn from the battery 104" may exceed the shutdown threshold current and trigger the battery protection circuit 107" to shut down the battery 106".

An audio DSP 110" for audio system 102" and a haptic DSP 404" for the haptic system 400" are integrated into a single DSP block 700 and are coupled with and/or communicate with one another. In embodiment, the audio DSP 110" for the audio system 104" includes a first intelligent current limiter 102A and the haptic DSP 404" for the haptic system 400" includes a second intelligent current limiter 102H.

The first intelligent current limiter 102A manages the gain at the audio DSP 110" and applies the gain at the audio DSP 110" to digital audio signals received at the audio DSP 110" prior to the transmission of the digital audio signals to the audio amplifier 112" for amplification. The second intelligent current limiter 102H manages the gain at the haptic DSP 404" and applies the gain at the haptic DSP 404" prior to the transmission of the digital haptic signals to the haptic amplifier 406" for amplification. The first intelligent current limiter 102A communicates and/or cooperates with the second intelligent current limiter 102H to ensure that that the combination of the audio amplifier 112" and haptic amplifier 406" does not draw battery current $I_{BAT}"$ from the battery 106" that exceeds the battery current budget $I_{BAT(LIM)}"$ allocated for the operation of both the audio amplifier 102" and the haptic amplifier 406". Thus, in embodiments, the first and second intelligent current limiters 102A and 102H may be aware of the amount of current the other's digital output system (e.g., audio system 104" or haptic system 400") is using and hence can optimize the consumption of its respective system accordingly. In an embodiment, the first and second current limiters 102A, 102H are combined into a single intelligent current limiter.

In an embodiment, the first and second intelligent current limiters 102A, 102H adjust the gain settings at the audio DSP 110" and the haptic DSP 404" in accordance with a power allocation priority.

Example Operating Environment

Figure 8:
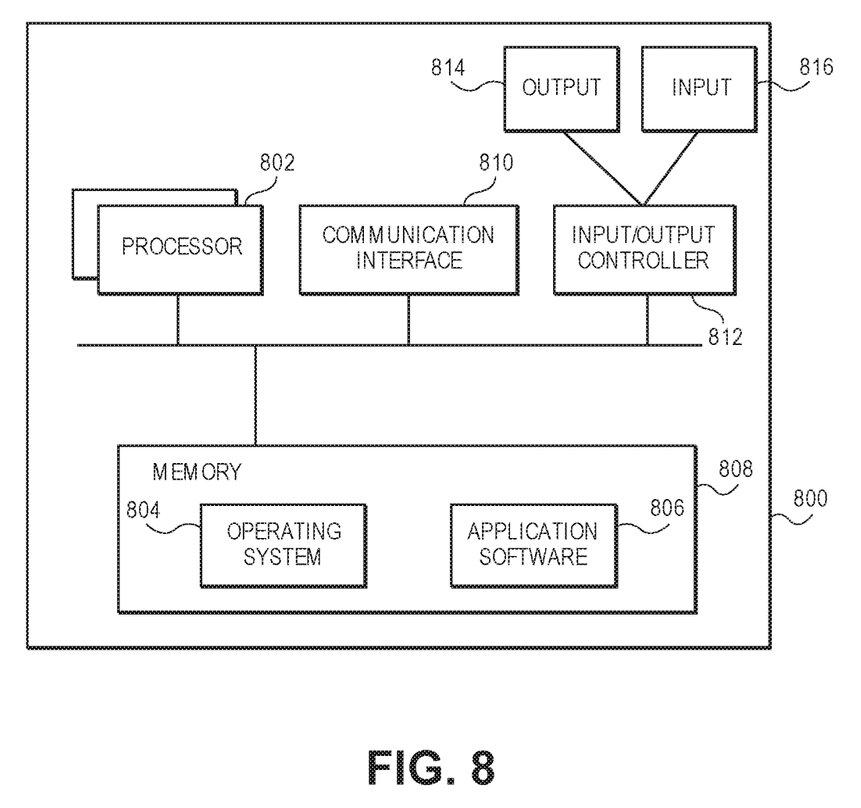
FIG. 8 is a block diagram representation of an example computer apparatus.

Referring to FIG. 8, a functional block diagram representation of an example computer apparatus 800 is shown. In an embodiment, components of a computing apparatus 800 may be implemented as a part of an electronic device, computing device and/or mobile computing device according to one or more embodiments described in this specification. The computing apparatus 800 comprises one or more processors 802 which may be microprocessors, controllers or any other suitable type of processors for processing computer executable instructions to control the operation of the electronic device. Platform software comprising an operating system 804 or any other suitable platform software may be provided on the computing apparatus 800 to enable application software 806 to be executed on the device.

Computer executable instructions may be provided using any computer-readable media that are accessible by the computing apparatus 800. Computer-readable media may include, for example, computer storage media such as a memory 808 and communications media. Computer storage media, such as a memory 808, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus 800. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 808) is shown within the computing apparatus 800, it will be appreciated by a person skilled in the art, that the storage may be distributed or located remotely and accessed via a network or other communication link (e.g. using a communication interface 810).

The computing apparatus 800 may comprise an input/output controller 812 configured to output information to one or more output devices 814, for example a display or a speaker, which may be separate from or integral to the electronic device. The input/output controller 812 may also be configured to receive and process an input from one or more input devices 816, for example, a keyboard, a microphone or a touchpad. In one embodiment, the output device 814 may also act as the input device. An example of such a device may be a touch sensitive display. The input/output controller 812 may also output data to devices other than the output device 814, e.g. a locally connected printing device.

The functionality described herein can be performed, at least in part, by one or more hardware logic components. According to an embodiment, the computing apparatus 800 is configured by the program code when executed by the processor 802 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and mobile devices, for example, in laptop computers, tablet computers, game consoles or game controllers, various wearable devices, embedded devices, etc.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A mobile computing device, comprising:
   a first digital signal processor configured to receive a first digital signal;
   a first amplifier configured to process the received first digital signal; and
   a first output generator communicatively coupled to the first amplifier;
   a second digital signal processor configured to receive a second digital signal;
   a second amplifier configured to process the received second digital signal; and
   a second output generator communicatively coupled to the second amplifier;
   a portable energy source configured to supply power to at least the first amplifier and the second amplifier; and
   an intelligent current limiter configured to:
   determine a power consumption limit based on a voltage of the portable energy source, a portable energy source current limit defined by a portable energy source current budget for operation of the first amplifier and the second amplifier, an efficiency of the first amplifier and an efficiency of the second amplifier,
   determine a first predicted power consumption by the first amplifier based on the first digital signal received at the first digital signal processor, a gain of the first amplifier, and an admittance of the first output generator,
   determine a second predicted power consumption by the second amplifier based on the second digital signal received at the second digital signal processor, a gain of the second amplifier, and an admittance of the second output generator,
   determine a combined predicted power consumption based on the first and second predicted power consumptions, compare the combined predicted power consumption with the power consumption limit, and adjust at least one of a gain setting at the first digital signal processor and a gain setting at the second digital signal processor based on the comparison prior to supplying the first digital signal to the first amplifier and the second digital signal to the second amplifier.

2. The mobile computing device as recited in claim 1, wherein at least one of the first digital signal and the second digital signal comprises a digital audio signal, at least one of the first amplifier and the second amplifier comprises an audio amplifier, and at least one of the first output generator and the second output generator comprises a speaker.

3. The mobile computing device as recited in claim 1, wherein at least one of the first digital signal and the second digital signal comprises a digital haptic signal, at least one of the first amplifier and the second amplifier comprises a haptic amplifier, and at least one of the first output generator and the second output generator comprises a haptic vibrator.

4. The mobile computing device as recited in claim 1, wherein the intelligent current limiter is configured to adjust at least one of the gain setting of the first digital signal processor and the gain setting of the second digital signal processor based on a power allocation priority.

5. The mobile computing device as recited in claim 1, wherein the intelligent current limiter is configured to:

determine the first predicted power consumption by the first amplifier by determining a product of a predicted voltage across the first output generator associated with processing the first digital signal and a predicted current generated by the first amplifier associated with processing the first digital signal, and determine the second predicted power consumption by the second amplifier by determining a product of a predicted voltage across the second output generator associated with processing the second digital signal and a predicted current generated by the second amplifier associated with processing the second digital signal.

6. The mobile computing device as recited in claim 5, wherein the intelligent current limiter is configured to:

determine the first predicted voltage across the first output generator associated with processing the first digital signal by determining a product of a voltage of the first digital signal and the gain of the first amplifier, and determine the second predicted current generated by the second amplifier associated with processing the second digital signal by determining a product of a voltage the second digital signal, the gain of the second output generator, and the admittance of the second output generator.

7. The mobile computing device as recited in claim 6, wherein the admittance of the first output generator and the admittance of the second output generator varies as a function of a frequency of the first digital signal and the second digital signal, respectively.

8. The mobile computing device as recited in claim 1, wherein the mobile computing device comprises one of a mobile phone, a tablet, and a laptop computer.

9. A mobile computing device, comprising:
an audio system comprising:
an audio digital signal processor configured to receive a digital audio signal;
an audio amplifier; and
a speaker coupled to an output of the audio amplifier;
a haptic system comprising:
a haptic digital signal processor configured to receive a digital haptic signal;
a haptic amplifier; and
a haptic vibrator coupled to an output of the haptic amplifier;
a portable energy source configured to supply power to at least the audio amplifier and the haptic amplifier; and
an intelligent current limiter configured to:
determine a power consumption limit based on a voltage of the portable energy source, a portable energy source current limit defined by a portable energy source current budget for operation of the audio amplifier and the haptic amplifier, an efficiency of the audio amplifier and an efficiency of the haptic amplifier, determine a first predicted power consumption by the audio amplifier based on the digital audio signal received at the audio digital signal processor, a gain of the audio amplifier, and an admittance of the speaker, determine a second predicted power consumption by the haptic amplifier based on the digital haptic signal received at the haptic digital signal processor, a gain of the haptic amplifier, and an admittance of the haptic vibrator, determine a combined predicted power consumption based on the first and second predicted power consumptions, compare the combined predicted power consumption with the power consumption limit, and adjust at least one of again setting at the audio digital signal processor and a gain setting at the haptic digital signal processor based on the comparison prior to supplying the digital audio signal to the audio amplifier and the digital haptic signal to the haptic amplifier.

10. The mobile computing device as recited in claim 9, wherein the intelligent current limiter is configured to adjust at least one of the gain setting of the audio digital signal processor and the gain setting of the haptic digital signal processor based on a power allocation priority.

11. The mobile computing device as recited in claim 9, wherein the intelligent current limiter is configured to:

determine the first predicted power consumption by the audio amplifier by determining a product of a predicted voltage across the speaker associated with processing the digital audio signal and a predicted current generated by the audio amplifier associated with processing the digital audio signal, and determine the second predicted power consumption by the haptic amplifier by determining a product of a predicted voltage across the haptic vibrator associated with processing the digital haptic signal and a predicted current generated by the haptic amplifier associated with processing the digital haptic signal.

12. The mobile computing device as recited in claim 11, wherein the at least one processor causes the intelligent current limiter to:

determine the first predicted voltage across the speaker associated with processing the digital audio signal by determining a product of a voltage of the digital audio signal and the gain of the audio amplifier, and determine the second predicted current generated by the haptic amplifier associated with processing the digital haptic signal by determining a product of a voltage the digital haptic signal, the gain of the haptic amplifier, and the admittance of the haptic vibrator.

13. The mobile computing device as recited in claim 11, wherein the admittance of the speaker and the admittance of the haptic vibrator varies as a function of a frequency of the digital audio signal and the digital haptic signal, respectively.

14. The mobile computing device of claim 9, wherein the mobile computing device comprises one of a mobile phone, a tablet, and a laptop computer.

15. A digital signal processor for a mobile computing device including an intelligent current limiter, comprising:
   at least one processor; and
   at least one memory comprising computer program code, the at least one memory and the computer program code configured to, with the at least one processor, cause the intelligent current limiter to:
      determine a first predicted power consumption by an audio amplifier based on a digital audio signal received at an audio system, a gain of the audio amplifier, and an admittance of a speaker coupled to the audio amplifier,
      determine a second predicted power consumption by a haptic amplifier based on a digital haptic signal received at a haptic system, a gain of the haptic amplifier, and an admittance of a haptic vibrator coupled to the haptic amplifier,
      determine a combined predicted power consumption based on the first and second predicted power consumptions,
      determine a power consumption limit based on a battery voltage of a battery configured to supply power to the audio amplifier and the haptic amplifier, a battery current limit associated with the battery and defined by a battery current budget for operation of the audio amplifier and the haptic amplifier, an efficiency of the audio amplifier and an efficiency of the haptic amplifier,
      compare the combined predicted power consumption with the power consumption limit, and
      adjust at least one of a gain setting at the audio digital signal processor and a gain setting at the haptic digital signal processor based on the comparison prior to supplying the digital audio signal to the audio amplifier and the digital haptic signal to the haptic amplifier.

16. The digital signal processor as recited in claim 15, wherein the at least one processor causes the intelligent current limiter to adjust at least one of the gain setting of the audio digital signal processor and the gain setting of the haptic digital signal processor based on a power allocation priority.

17. The digital signal processor as recited in claim 16, wherein the at least one processor causes the intelligent current limiter to:
   determine the first predicted voltage across the speaker associated with processing the digital audio signal by determining a product of a voltage of the digital audio signal and the gain of the audio amplifier, and
   determine the second predicted current generated by the haptic amplifier associated with processing the digital haptic signal by determining a product of a voltage the digital haptic signal, the gain of the haptic amplifier, and the admittance of the haptic vibrator.

18. The digital signal processor as recited in claim 16, wherein the admittance of the speaker and the admittance of the haptic vibrator varies as a function of a frequency of the digital audio signal and the digital haptic signal, respectively.

19. The digital signal processor as recited in claim 15, wherein the at least one processor causes the intelligent current limiter to:
   determine the first predicted power consumption by the audio amplifier by determining a product of a predicted voltage across the speaker associated with processing the digital audio signal and a predicted current generated by the audio amplifier associated with processing the digital audio signal, and
   determine the second predicted power consumption by the haptic amplifier by determining a product of a predicted voltage across the haptic vibrator associated with processing the digital haptic signal and a predicted current generated by the haptic amplifier associated with processing the digital haptic signal.

20. The digital signal processor of claim 15, wherein the mobile computing device comprises one of a mobile phone, a tablet, and a laptop computer.

* * * * *